United States Patent [19]
Yabe

[11] Patent Number: 5,594,210
[45] Date of Patent: Jan. 14, 1997

[54] WATERPROOF PROTECTIVE COVER

[75] Inventor: Kazuyoshi Yabe, Shizuoka-ken, Japan

[73] Assignee: Yazaki Corporation, Tokyo, Japan

[21] Appl. No.: 314,383

[22] Filed: Sep. 28, 1994

[51] Int. Cl.$^6$ .................................................. H02G 15/08
[52] U.S. Cl. .................................................. 174/76; 174/92
[58] Field of Search .................................. 174/92, 88 R, 174/84 R, 138 F, 76

[56] References Cited

U.S. PATENT DOCUMENTS

| | | | |
|---|---|---|---|
| 3,519,731 | 7/1970 | Grunbaum | 174/138 F |
| 3,683,314 | 8/1972 | Elkins | 174/138 F |
| 3,842,191 | 10/1974 | Neale, Sr. | 174/88 R |
| 4,029,896 | 6/1977 | Skinner | 174/138 F |
| 4,451,696 | 5/1984 | Beinhaur | 174/92 |
| 4,550,220 | 10/1985 | Kitchens | 174/138 F |
| 4,610,738 | 9/1986 | Jervis | 156/49 |
| 4,795,857 | 1/1989 | McInnis | 174/138 F |
| 4,849,580 | 7/1989 | Reuter | 174/92 |
| 4,859,809 | 8/1989 | Jervis | 174/92 |
| 4,863,535 | 9/1989 | More | 174/84 R |
| 5,021,611 | 6/1991 | Amano | 174/88 R |
| 5,030,798 | 7/1991 | Schilling | 174/92 |
| 5,347,084 | 9/1994 | Roney et al. | 174/92 |
| 5,397,859 | 3/1995 | Robertson et al. | 174/92 |
| 5,410,105 | 4/1995 | Tahara et al. | 174/92 |

FOREIGN PATENT DOCUMENTS

| | | |
|---|---|---|
| 995315 | 8/1976 | Canada . |
| 3320916A1 | 12/1984 | Germany . |
| 59-109175 | 7/1984 | Japan . |
| 59-119576 | 8/1984 | Japan . |
| 6-9064 | 2/1994 | Japan . |
| 6-41060 | 5/1994 | Japan . |

*Primary Examiner*—Laura Thomas
*Assistant Examiner*—Marc D. Machtinger
*Attorney, Agent, or Firm*—Wigman, Cohen, Leitner & Myers, P.C.

[57] ABSTRACT

A waterproof protective cover includes an upper casing member having bores formed at both endwalls in a longitudinal direction thereof to pass the electrical wires therethrough and a lower casing member pivotably connected to the upper casing member through a hinge attached to each sidewall of the upper and lower casing members. The lower casing member also has bores formed at both endwalls in a longitudinal direction thereof to pass the electrical wires therethrough. A storage chamber is defined by the upper and lower casing members when the former is engaged with the latter. Being filled up with an insulating sealant, the chamber serves to accommodate a connection part of the connected wires. A reservoir chamber for receiving the insulating sealant flowing out of the storage chamber is arranged between the bores of the upper and lower casing members and the storage chamber. Further, the upper casing member has a seal plate formed on a sidewall thereof. When the upper casing member is engaged with the lower casing member, the seal plate is accommodated inside the other lower casing member, whereby the outflow of the sealant through a seam of the sidewalls of the upper and lower casing members can be checked.

11 Claims, 3 Drawing Sheets

WATERPROOF PROTECTIVE COVER

BACKGROUND OF THE INVENTION

The present invention relates to a waterproof protective cover for protecting a connection part of electrical wires in a waterproof manner.

Conventional arts include protective covers for electrical wires in Japanese Utility Model Publications Nos. 59-119576 and 59-109175.

In Japanese Utility Model Publication No. 59-119576, the protective cover consists of two semi-cylindrical bodies which are pivotably connected to each other by hinges so as to open and close the semi-cylindrical bodies. Each of the semi-cylindrical bodies includes an outer shell and an inner wall arranged inside the outer shell to extend along a periphery of the cover. Inside the protective cover, an inner chamber is defined by the inner wall and an elongated clearance is formed between the outer shell and the inner wall. The protective cover is provided at both ends thereof in the longitudinal direction with openings for passing an electrical wire therethrough. On respective lateral edges of the bodies opposite to the hinges, a pair of latching members are arranged to engage the semi-cylindrical body with the other body. Insulating compound is filled in the inner chamber. In a pre-using state of the cover, thin sheets are arranged on the compounds filled in the respective semi-cylindrical bodies in order to prevent the filled compound from drying and hardening.

In case of using the above-mentioned cover, after tearing off the thin sheets, a connection part of the electrical wires connected to each other by press-fitting or the like is positioned in the inner chamber and then the semi-cylindrical bodies are closed by engaging the latching member to the other member, whereby the connection part can be protected in the cover.

In the above mentioned protective cover, however, the sheets are required for preventing the drying and hardening of the compound. Further, in the cover, when the latching member is engaged with the other latching member, there is a possibility of flowing of the insulating compound out of the inner chamber despite provision of the elongated clearance. Furthermore, since the insulating compound does not harden immediately, even after the sheets have been torn off, there is a problem in that the electrical wires are deviated from a predetermined position by an axial tensile strength onto the wires.

On the other hand, also in Japanese Utility Model Publication No. 59-109175, the protective cover consists of two semi-cylindrical members which are pivotably connected to each other by hinges. Further, each of the semi-cylindrical members is provided at both ends thereof with respective chambers each of which is defined by axial partitions formed in the semi-cylindrical member. In the so-constructed protective cover, since the sealant is supplied in only the chambers arranged at both ends of the semi-cylindrical member, it is possible to reduce an amount of sealant flowing out of the cover when the electrical wire is packed therein, in comparison with that in the previously mentioned protective cover.

However, if the sealant flows out from holes at both ends of the cover, an engagement part of latching members or the like, in even a small amount, a clearance is produced about each electrical wire, so that there would be a problem of intrusion of water into the cover through the clearance. Therefore, this protective cover has a waterproof function inferior to that in the previous protective cover in which the insulating compound surrounds the electrical connection part of the wires directly.

SUMMARY OF THE INVENTION

It is therefore an object of the present invention to provide a waterproof protective cover which improves respective capabilities in terms of electrical insulation, waterproof and mechanical protection at the electrical connection part in the cover and which provides a simple operation when attaching it to the electrical wires.

The object of the invention described above can be accomplished by a waterproof protective cover for protecting a connection part of electrical wires connected to each other in a waterproof manner, comprising:

an upper casing member having bores formed at both endwalls in a longitudinal direction thereof to pass the electrical wires therethrough;

a lower casing member pivotably connected to the upper casing member through a hinge attached to each sidewall of the upper and lower casing members, the lower casing member having bores formed at both endwalls in a longitudinal direction thereof to pass the electrical wires therethrough;

a storage chamber for accommodating the connection part, to be filled up with an insulating sealant, the storage chamber being defined by the upper and lower casing member when the former is engaged with the latter;

reservoir chambers for retaining the insulating sealant flowing out of the storage chamber, the reservoir chambers being arranged between the bores of the upper and lower basing members and the storage chamber; and a seal plate provided on either of the upper casing member and the lower casing member, the seal plate being arranged on another sidewall opposite to the sidewall to which the hinge is attached, the seal plate being accommodated inside another sidewall of the other casing member which is not provided with the seal plate.

With the arrangement mentioned above, if the sealant flows out of the storage chamber since the electrical wires push away the sealant, outflow portions moving in the longitudinal direction of the casing members can be received by the reservoir chambers on both sides of the storage chamber. On the other hand, the other flow portion flowing through a seam of the sidewalls of the upper and lower casing members can be checked by the seal plate. Therefore, according to the arrangement, it is possible to prevent the sealant from flowing out of the cover when the upper casing member is engaged with the lower casing member.

In the present invention, preferably, either of the upper casing member and the lower casing member is provided on a bottom wall thereof with a positioning plate having a pair of positioning ribs between which the electrical wire is interposed. In this case, it is possible to restrict the movement of the electrical wire in a direction across the longitudinal direction of the upper and lower casing members.

Preferably, a distance between the positioning ribs is established so as to be smaller than an outer diameter of the electrical wire and to be larger than an outer diameter of a core part of the electrical wire. In such a case, with such an arrangement that the positioning ribs interpose the core part of the electrical wire therebetween in the vicinity of the connection part of the wires, it is possible to restrict the movement thereof in the longitudinal direction of the casing members by an interference of the ribs with the wire and the connection part.

Preferably, the upper casing member and the lower casing member are provided in the storage chamber with rectangular pins which project from respective bottom walls of the casing chambers. Further, in the longitudinal direction of the upper and lower casing members, the respective positions of the triangular pins are established to differ from each other. In this case, by an arrangement of the rectangular pins between a wire and a subordinate wire which is connected to the wire, it is possible to increase a clearance between the wire and the subordinate wire by intersecting the rectangular pins with each other. Consequently, when the upper casing member is engaged with the lower casing member, the sealant flows into the clearance with certainly thereby protecting the wire and the subordinate wire under the insulating condition.

Other objects and features of the present invention will become more fully apparent from the following description and appended claims taken in conjunction with the accompanying drawings.

DESCRIPTION OF THE PREFERRED EMBODIMENT

An embodiment of the present invention is now described with reference to the drawings.

Figure 1:
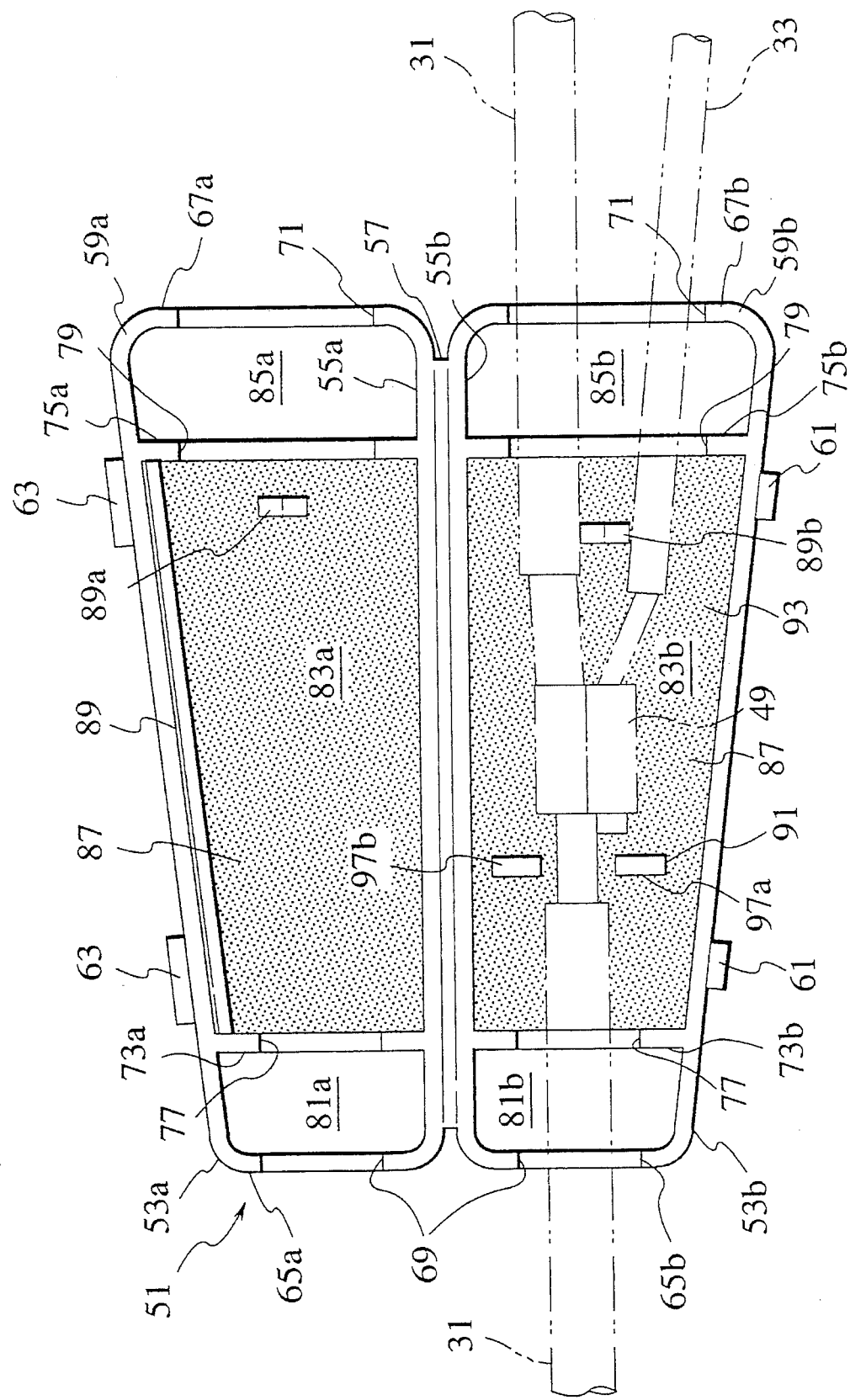
FIG. 1 is a plan view showing a waterproof protective cover in accordance with an embodiment of the present invention.
Figure 2:
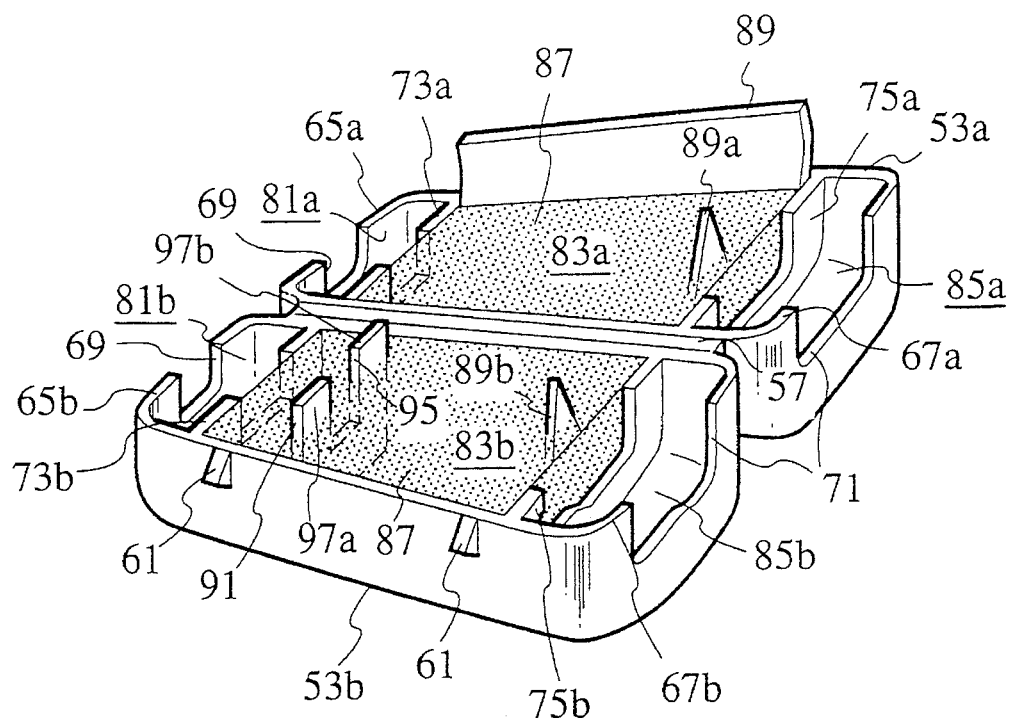
FIG. 2 is a perspective view of the waterproof protective cover of FIG. 1.

As shown in FIGS. 1 and 2, a waterproof protective cover 51 in accordance with the invention includes an upper casing member 53a and a lower casing member 53b. These casing member 53a and 53b may be provided by molding a box-shaped casing out of resinous insulation and then dividing the casing into two bodies in a longitudinal direction thereof (corres. to a horizontal direction in FIG. 1).

Sidewalls 55a and 55b of the upper and lower casing members 53a and 53b, which are marginal portions on left and right sides thereof in the longitudinal direction, respectively, are pivotably connected through the intermediary of a hinge 57, whereby the upper and lower casing members 53a and 53b can open and close to each other.

Projections 61 for engagement are arranged on an outer surface of a sidewall 59b opposite to the sidewall 55b of the lower casing member 53b. On the other hand, the upper casing member 53a is provided on an outer surface of a sidewall 59a thereof opposite to the sidewall 55a with flexible rims 63 to be engaged with the projections 61, respectively.

Further, the upper and lower casing members 53a and 53b have a first bore 69 and a second bore 71 for wire formed on both endwalls 65a, 65b, 67a and 67b thereof in the longitudinal direction, respectively.

In the upper and lower casing members 53a and 53b, first partition walls 73a and 73b and second partition walls 75a and 75ba are arranged to extend along a direction perpendicular to the longitudinal direction of the casing members 53a and 53b. A first hole 77 is defined at seams of the first partition walls 73a and 73b and similarly, a second hole 79 is defined at seams of the second partition walls 75a and 75b. By these first and second partition walls 73a, 73b, 75a and 75b, the respective insides of the upper and lower casing members 53a and 53b are divided into first reservoir chamber (portions) 81a and 81b, respectively arranged inside the endwalls 65a and 65b, second reservoir chamber (portions) 85a and 85b respectively arranged inside the endwalls 67a and 67b and storage chamber (portions) 83a and 83b for an electrical connection part arranged between the first reservoiring chambers 81a, 81b and the second reservoir chambers 85a, 85b, respectively.

Under a united condition of the casing members 53a and 53b, the first partition walls 73a and 73b are united with the second partition walls 75a and 75b, respectively, thereby to define a first reservoir chamber 81, a storage chamber 83 and a second reservoir chamber 85 in the waterproof protective cover 51.

The storage chamber portions 83a and 83b positioned at the center of the casing members 53a and 53b are filled up with a jelly sealant 87 of soft and insulating seal material. Materials, such as butyl rubber of low stickiness, grease of mineral oil group, grease of silicon group, silicon gum, or the like may be utilized as the sealant 87.

Accommodated in the storage chamber 83 is a connection part 49 of an electrical wire 31, at which a subordinate electrical wire 33 is branched. On one side of the cover 51, the wire 31 is arranged to pass through the first bore 69 and the first hole 77. On the other side of the cover 51, the branched wires 31 and 33 are arranged to pass through the second bore 71 and the second hole 79.

Further, arranged in the storage chamber portion 83b of the lower casing member 53b and on a side thereof close to the first reservoir chamber portion 81b is a positioning plate 91 which stands on a bottom wall 93 of the chamber portion 83b and which is provided at a top end thereof with a rectangular cut-out 95 defined by a pair of positioning ribs 97a and 97b. The distance between the positioning ribs 97a and 97b is established so as to be smaller than the outer diameter of wire 31 and to be larger than an outer diameter of a core part of the wire 31. Further, the height of positioning plate 91 is established in such a manner that, under a condition that the storage chamber portion 83b filled up with the sealant 87, the respective tip ends of the positioning ribs 97a and 97b project from a surface of the sealant 87, as shown in FIG. 2.

In operation, by interposing the core portion of the wire 31 passing through the first bore 69 and the first hole 77 between the positioning ribs 97a and 97b, it is possible to restrict the movement of the wire 31 in the direction across the longitudinal direction of the cover 51. In addition, with an arrangement that the positioning ribs 97a and 97b interpose the core part of the electrical wire 31 therebetween in the vicinity of the connection part 49, it is possible to restrict the movement of the wire 31 in the longitudinal direction of the casing members 53a and 53b since the ribs 97a and 97b provide a stop surface by an interference of the ribs 97a and 97b with the wire 31 and the connection part 49.

On the other hand, in the storage chamber portions 83a and 83b of the casing members 53a and 53b, triangular pins 89a and 89b for holding the wires are arranged on the sides of the second reservoir chamber portions 81a and 81b to stand on bottom walls of the chamber portions 83a and 83b, respectively. In the longitudinal direction of the cover 51, the respective positions of the triangular pins 89a and 8b are established to differ from each other, so as to prevent their interference when the cover 51 is closed.

Provided just inside the sidewall 59a of the upper casing member 53a is a seal plate 89 Which is to be accommodated inside the sidewall 59b of the lower casing member 53b under condition that the upper casing member 53a is engaged with the lower casing member 53b

The connection part 49 is protected by the so-constructed waterproof protective cover 51 as follows.

At first, when the casing member 53a and 53b are open relative to each other, the connection part 49 accommodated into the the chamber portion 83b of the lower casing member 53b. Then, the wire 31 is inserted into the first bore 69 and the wires 31 and 33 are inserted into the second bore 71. Simultaneously, the core part of the wire is arranged between the positioning ribs 97a land 97b, thereby restricting the displacement of the wire 31 in the inserting direction into the cover 51. further, the wires 31 and 33 including the connection part 49 are so arranged in the cover 51 that the triangular pin 89b is positioned between the wire 31 and the subordinate wire 33. Note that, the above mentioned operation can be easily attained due to the positioning plate 91 and the pin 89b.

Figure 3A:
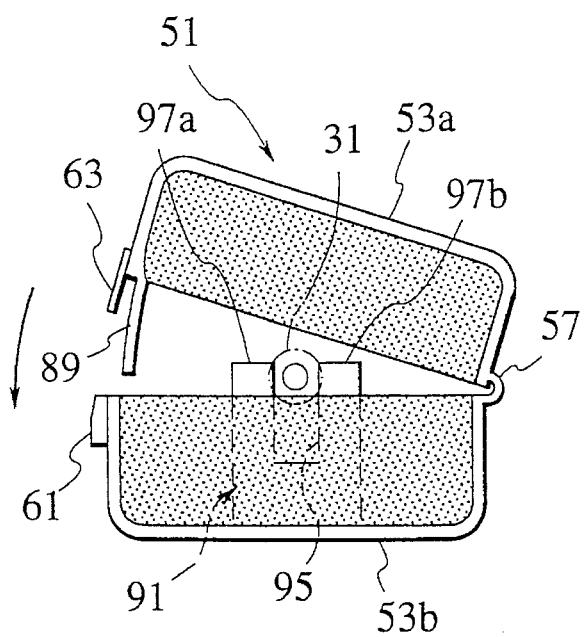
FIG. 3A is a cross-sectional view of the waterproof protective cover of FIG. 1, showing a relationship in position between an upper casing member and a lower casing member just before the former is engaged with the latter.
Figure 3B:
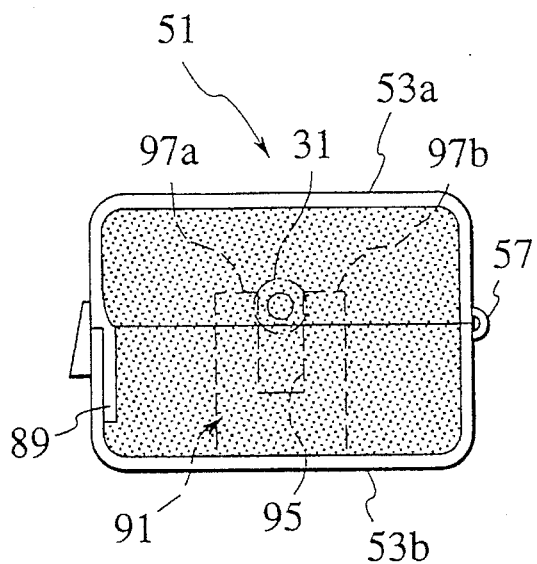
FIG. 3B is a cross-sectional view of the waterproof protective cover of FIG. 1, showing a relationship in position between the upper casing member and the lower casing member after the former is engaged with the latter.
Figure 4:
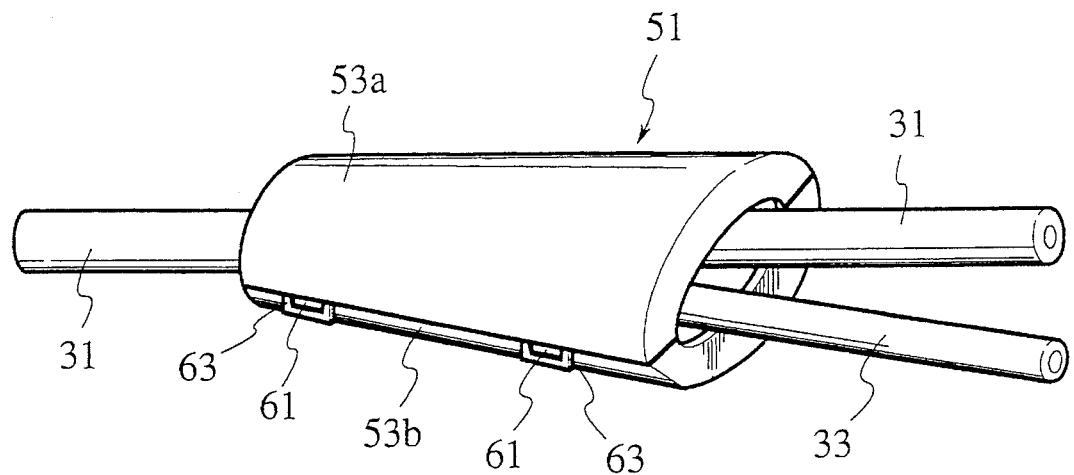
FIG. 4 is a perspective view of the waterproof protective cover of FIG. 1 in use.

After arranging the wires 31 and 33 and the connection part 49 as above, the rim 63 of the upper casing member 53b is engaged with the projection 61 of the lower casing member 53b as shown in FIGS. 3A and 3B, so that the cover 51 as shown in FIG. 4 can be obtained. Consequently, since the wires 31 and 33 including the connection part 49 are surround by the jelly sealant 87, the connection part 49 is protected under an insulating condition.

Corresponding to the above engagement of the casing members 53a and 53b, although the sealant 87 is apt to flow out of the storage chamber 83 by pushing away of the wires 31 and 33, the flow toward a seam of the sidewalls 59a and 59b of the upper and lower casing members 53a and 53b can be checked by the seal plate 89, so that the outflow in this direction can be prevented.

On the other hand, the respective overflows of the sealant 87 in the longitudinal direction of the casing members 53a and 53b pass through the first and second holes 77 and 79 and then flow into the reservoir chambers 81 and 85 on both sides of the storage chamber 83. Note, in the embodiment, since the reservoir chambers 81 and 85 are formed to have capacities enough to receive the overflows, there is no possibility that the sealant 87 flows out of the reservoir chambers 81 and 85 through the respective bores 69 and 71, so that it is possible to prevent the sealant 87 from flowing out of the cover 51 when the electrical wires 31 and 33 are packed in the cover 51.

Figure 5A:
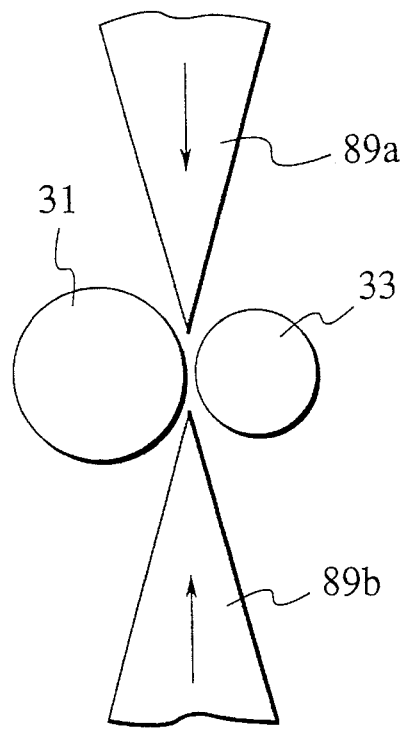
FIG. 5A is a schematic view showing a relationship in position between triangular pins and electrical wires just before the upper casing member is engaged with the lower casing member of FIG. 1.
Figure 5B:
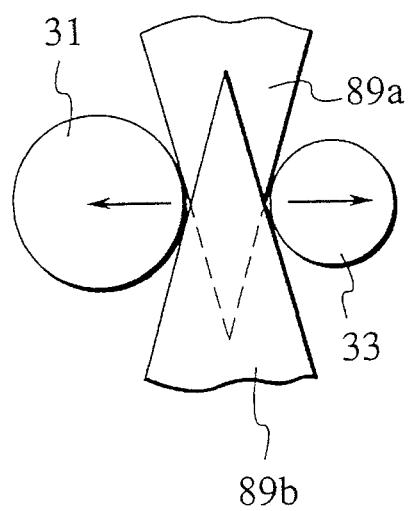
FIG. 5B is a schematic view showing a relationship in position between the triangular pins and the electrical wires after the upper casing member is engaged with the lower casing member of FIG. 1.

Furthermore, since the engagement of the upper casing member 53a with the lower casing member 53b allows the upper and lower pins 89a and 89b to increase the clearance between the wire 31 and the subordinate wire 33 as shown in FIG. 5, the sealant 87 flows into the clearance with certainty, thereby protecting them under the insulating condition.

In addition, according to the invention, since the wires 31 and 33 can be held by the pins 89a and 89b securely, the connection part 49 would not move to and fro even if any tension is applied on the wire 31, so that it is possible to protect the connection part 49 in the waterproof manner with certainty.

Although the positioning plate 91 is provided in the lower chamber portion 88b in the above mentioned embodiment, the plate 91 may be arranged in the chamber portion 88a of the upper casing member 58a conversely in another form of the invention.

Finally, it will be understood by those skilled in the art that the forgoing description of the preferred embodiments of the disclosed structure, and that various changes and modifications may be made to the present invention without departing from the spirit and scope thereof.

What is claimed is:

1. A waterproof protective cover for protecting a connection part of electrical wires in a waterproof manner, comprising:

an upper casing member having bores formed at two upper endwalls thereof to pass said electrical wires therethrough, said two upper endwalls defining a longitudinal direction of said cover;

a lower casing member pivotably connected to said upper casing member through a hinge attached to a sidewall of each of said upper and lower casing members, said lower casing member having bores formed at two lower endwalls thereof to pass said electrical wires therethrough;

a storage chamber for accommodating said connection part and for holding an insulating sealant, said storage chamber being defined by said upper and lower casing members when said upper casing member is engaged with said lower casing member;

reservoir chambers for retaining said insulating sealant flowing out of said storage chamber, said reservoir chambers being arranged between said bores of said upper and lower casing members and said storage chamber; and a seal plate provided on either one of said upper casing member and said lower casing member, said seal plate being arranged on a leading edge of a sidewall opposite to said sidewall to which said hinge is attached, said seal plate being accommodated inside another sidewall of the casing member which is not provided with seal plate when said upper casing member is engaged with said lower casing member;

wherein said upper casing member and said lower casing member are provided with triangular pins formed on laterally extending walls of said upper casing member and said lower casing member, respectively; and wherein said triangular pins project from said upper casing member and said lower casing member and provide clearance between said electrical wires.

2. A waterproof protective cover as claimed in claim 1, wherein one of said upper casing member and said lower casing member is provided, on the bottom wall thereof, with a positioning plate for restricting the movement of said electrical wires in a direction transverse to said longitudinal direction.

3. A waterproof protective cover as claimed in claim 2, wherein said positioning plate is provided, at a top thereof, with a pair of positioning ribs which are arranged in the vicinity of said connection part to provide a stop surface for restricting the movement of said connection part in said longitudinal direction.

4. A waterproof protective cover as claimed in claim 3, wherein a distance between said positioning ribs is smaller than an outer diameter of said electrical wire and larger than an outer diameter of a core part of said electrical wire.

5. A waterproof protective cover as claimed in claim 1, wherein, in said longitudinal direction, the respective positions of said triangular pins differ from each other.

6. A waterproof protective cover for protecting a connection part of electrical wires in a waterproof manner, comprising:

an upper casing member having bores formed at two upper endwalls thereof to pass said electrical wires therethrough, said two upper endwalls defining a longitudinal direction of said cover;

a lower casing member pivotably connected to said upper casing member through a hinge attached to a sidewall of each of said upper and lower casing members, said lower casing member having bores formed at two lower endwalls thereof to pass said electrical wires therethrough;

a storage chamber for accommodating said connection part and for holding an insulating sealant, said storage chamber being defined by said upper and lower casing members when said upper casing member is engaged with said lower casing member;

reservoir chambers for retaining said insulating sealant flowing out of said storage chamber, said reservoir chambers being arranged between said bores of said upper and lower casing members and said storage chamber; and a positioning plate disposed on a bottom wall of one of said upper casing member and said lower casing member to restrict the movement of said electrical wires in a direction transverse to said longitudinal direction;

wherein said upper casing member and said lower casing member are provided with triangler pins formed on laterally extending walls of said upper casing member and said lower casing member, respectively; and wherein said triangular pins project from said upper casing member and said lower casing member and provide clearance between said electrical wires.

7. A waterproof protective cover as claimed in claim 6, wherein said positioning plate is provided, at a top thereof, with a pair of positioning ribs which are arranged in the vicinity of said connection part to provide, a stop surface for restricting the movement of said connection part in said longitudinal direction.

8. A waterproof protective cover as claimed in claim 7, wherein a tip end of each said positioning rib projects from a surface of said sealant when said storage chamber is filled up with the insulating sealant.

9. A waterproof protective cover as claimed in claim 7, wherein a distance between said positioning ribs is smaller than an outer diameter of said electrical wire and larger than an outer diameter of a core part of said electrical wire.

10. A waterproof protective cover for protecting a connection part of electrical wires in a waterproof manner, comprising:

an upper casing member having bores formed at two upper endwalls thereof to pass said electrical wires therethrough, said two endwalls defining a longitudinal direction of said cover;

a lower casing member pivotably connected to said upper casing member through a hinge attached to a sidewall of each of said upper and lower casing members, said lower casing member having bores formed at two lower endwalls thereof to pass said electrical wires therethrough;

a storage chamber for accommodating said connection part and for holding an insulating sealant, said storage chamber being defined by said upper and lower casing members when said upper casing member is engaged with said lower casing member; and reservoir chambers for retaining said insulating sealant flowing out of said storage chamber, said reservoir chambers being arranged between said bores of said upper and lower casing members and said storage chamber;

wherein said upper casing member and said lower casing member are provided with triangular pins formed on laterally extending walls of said upper casing member and said lower casing member, respectively; and wherein said triangular pins project from said upper casing member and said lower casing member and provide clearance between said electrical wires.

11. A waterproof protective cover as claimed in claim 10, wherein, in said longitudinal direction, the respective positions of said triangular pins differ from each other.

* * * * *

UNITED STATES PATENT AND TRADEMARK OFFICE
CERTIFICATE OF CORRECTION

PATENT NO. : 5,594,210
DATED : January 14, 1997
INVENTOR(S) : Kazuyoshi YABE

It is certified that error appears in the above-indentified patent and that said Letters Patent is hereby corrected as shown below:

Claim 7, column 8, line 4, the "," should be deleted.

Signed and Sealed this

Sixth Day of May, 1997

Attest:

BRUCE LEHMAN

Attesting Officer

Commissioner of Patents and Trademarks